(12) United States Patent
Yasuhiko

(10) Patent No.: US 7,633,690 B2
(45) Date of Patent: Dec. 15, 2009

(54) PHOTOGRAPHIC LENS

(75) Inventor: Abe Yasuhiko, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 72 days.

(21) Appl. No.: 11/983,625

(22) Filed: Nov. 9, 2007

(65) Prior Publication Data
US 2008/0266676 A1 Oct. 30, 2008

(30) Foreign Application Priority Data
Apr. 24, 2007 (KR) .................. 10-2007-0040052

(51) Int. Cl.
*G02B 9/34* (2006.01)
*G02B 3/02* (2006.01)

(52) U.S. Cl. .................. 359/773; 359/771; 359/772; 359/715

(58) Field of Classification Search .......... 359/715, 359/771, 772, 773
See application file for complete search history.

(56) References Cited
U.S. PATENT DOCUMENTS
6,917,479 B2 * 7/2005 Park ...................... 359/773

7,408,723 B1 * 8/2008 Lin ........................ 359/715
7,443,611 B2 * 10/2008 Shinohara ................ 359/772
7,453,654 B2 * 11/2008 Shinohara ................ 359/773

FOREIGN PATENT DOCUMENTS

| JP | 2002-228922 A | 8/2002 |
|---|---|---|
| JP | 2002-365529 A | 12/2002 |
| JP | 2002-365530 A | 12/2002 |
| JP | 2002-365531 A | 12/2002 |
| JP | 2003-322792 A | 11/2003 |
| JP | 2004-163849 A | 6/2004 |
| JP | 2004-212467 A | 7/2004 |
| JP | 2004-240074 A | 8/2004 |
| JP | 2004-326097 A | 11/2004 |
| JP | 2004-341501 A | 12/2004 |
| JP | 2004-341512 A | 12/2004 |
| JP | 2005-284153 A | 10/2005 |
| JP | 2006-317916 A | 11/2006 |
| JP | 2007-011237 A | 1/2007 |
| KR | 10-0703469 A | 4/2007 |

* cited by examiner

*Primary Examiner*—David N Spector
(74) *Attorney, Agent, or Firm*—Drinker Biddle & Reath LLP

(57) ABSTRACT

A photographic lens comprising a first lens having a positive refractive power, a second lens having a negative refractive power, a third lens having a positive refractive power, and a fourth lens having a negative refractive power, wherein the lenses are numbered in order of location from the object, and wherein a surface of the fourth lens toward the object is an aspheric surface having an inflection point.

11 Claims, 8 Drawing Sheets

PHOTOGRAPHIC LENS

CROSS-REFERENCE TO RELATED PATENT APPLICATIONS

This application claims the benefit of Korean Patent Application No. 10-2007-0040052, filed on Apr. 24, 2007, in the Korean Intellectual Property Office, the disclosure of which is incorporated herein in its entirety by reference.

BACKGROUND OF THE INVENTION

1. Field of the Invention

The present invention relates to a photographic lens for a camera, and more particularly, to a photographic lens which has improved aberrations and is compact so as to be suitable for electronic still cameras, vehicle mounted cameras, PC cameras, mobile devices such as cameraphones, or mobile information devices, for example, PDAs which use a solid state image sensing device such as a charge-coupled device (CCD) or a complementary metal-oxide-semiconductor (CMOS).

2. Description of the Related Art

Recently, there is a strong demand for both an increase in the number of pixels of the imaging module of a cameraphone and a decrease in the size of such cameraphones. With the development of a solid state image sensing device, the injection angle of a main light ray corresponds to a range of 20-25°, and accordingly, a plurality of thin and compact lenses are under development. However, the pixel pitch of a photographic device has decreased to be less than 2 μm, and thus, an increase in the basic resolution of a photographic lens is strongly required. As such, it is important to provide a photographic lens that is thin and compact and simultaneously has a high resolution.

In this regard, Japanese Patent Publication Nos. 2003-322792, 2004-163849, 2004-212467, 2004-240074, 2004-326097, and 2005-284153 disclose photographic lenses formed of three lens units. However, these photographic lenses fail to provide the desired resolution because the correction of chromatism is insufficient for a pixel pitch of 2 μm or less.

Also, Japanese Patent Publication Nos. 2002-228922, 2002-365529, 2002-365530, 2002-365531, 2004-341501, and 2004-341512 disclose photographic lenses formed of four lens units. These photographic lenses appropriately correct chromatism, and thus, increase resolution for pixel pitch of 2 μm or less using the four lens units. However, since the length of the overall lens system as compared to the diagonal length of the solid state image sensing device is increased, these photographic lenses are not satisfactory for thin and compact lenses.

Reducing the back focal length (Bf) is one of the solution to make a thin and compact lens. However, when the Bf is excessively reduced, glass such as an infrared filter cannot be inserted in the rear portion of the lens or the amount of space allowed during assembly is reduced. Furthermore, when the injection angle is increased, a shading phenomenon such as a distortion of contrast occurs when making a thin and compact lens.

SUMMARY OF THE INVENTION

To solve the above and other problems, the present invention provides a photographic lens which is thin and compact and simultaneously has a sufficient resolution corresponding to a pixel pitch of 2 μm or less.

According to an aspect of the present invention, a photographic lens comprises a first lens having a positive refractive power, a second lens having a negative refractive power, a third lens having a positive refractive power, and a fourth lens having a negative refractive power, wherein the lenses are numbered in order of location from the object, and, wherein a surface of the fourth lens toward the object is an aspheric surface having an inflection point.

At least one surface or both surfaces of each of the first to fourth lenses is an aspheric surface.

An aperture stop is disposed between the first lens and the object.

The first lens is a meniscus lens having a convex surface toward the object.

The second lens is a meniscus lens having a convex surface toward the image.

The fourth lens is a meniscus lens having a convex surface toward the image.

The photographic lens satisfies any one or more of the following inequalities.

$$0.5 < f/|f_2| < 1,$$

$$0.3 < f_1/|f_2| < 0.8,$$

$$0.75 < f_3/|f_4| < 1,$$

$$v_1 - v_2 > 15, \text{ and}$$

$$0.9 < v_3/v_4 < 1.1.$$

In the inequalities, "f" is the focal length of the overall lens, "$f_1$", "$f_2$", "$f_3$", and "$f_4$" respectively are the focal lengths of the first, second, third, and fourth lenses, and "$v_1$", "$v_2$", "$v_3$", and "$v_4$" respectively are the Abbe numbers of the first, second, third, and fourth lenses.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
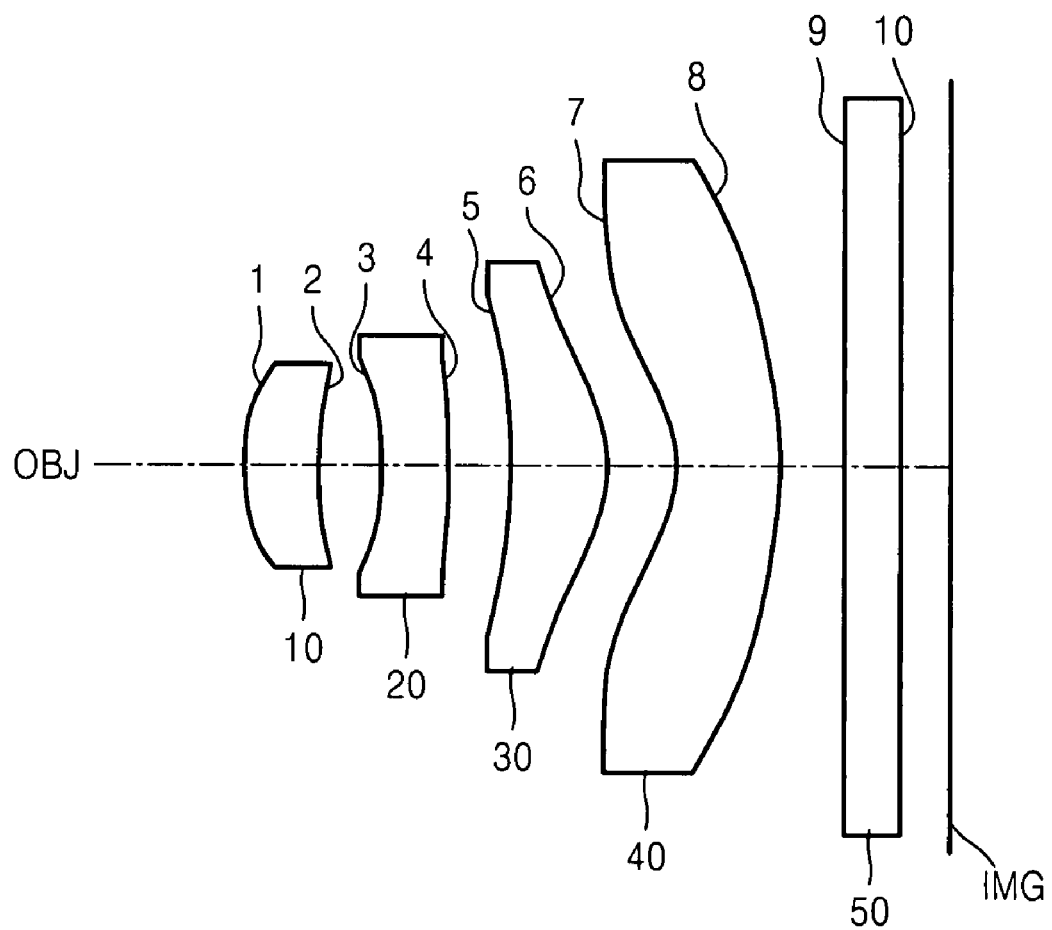
FIG. 1 illustrates the optical configuration of a photographic lens according to an embodiment of the present invention.

The attached drawings for illustrating preferred embodiments of the present invention are referred to in order to describe the present invention, the merits thereof, and some of the objectives accomplished by the implementation of the present invention. Hereinafter, the present invention will be described in detail by describing preferred embodiments of the invention with reference to the attached drawings. Like reference numerals in the drawings denote like elements.

FIGS. 1, 3, 5, and 7 show the optical configuration of photographic lenses according to different embodiments of the present invention. Referring to FIGS. 1, 3, 5, and 7, each of the photographic lenses respectively include, with respect to an object OBJ, a first lens 10 having a positive refractive power, a second lens 20 having a negative refractive power, a third lens 30 having a positive refractive power, and a fourth lens 40 having a negative refractive power. Also, an aperture stop (not shown) is disposed between the first lens 10 and the object OBJ. A filter 50 blocking light in an infrared range may further be provided between the fourth lens 40 and the image plane IMG.

At least one surface of the first lens 10 is formed as an aspheric surface or both surfaces of the first lens 10 are formed as aspheric surfaces. For example, a positive meniscus lens having a convex surface toward the object OBJ can be adopted as the first lens 10. At least one surface of the first lens 10 is formed as an aspheric surface, and in particular, a surface toward the object OBJ is an aspheric surface. The aspheric shape of the surface of the first lens 10 toward the object OBJ may have an inflection point within an effective range, that is, within a lens surface. At least one surface of the second lens 20 is formed as an aspheric surface or both surfaces of the second lens 20 are formed as aspheric surfaces. For example, a negative meniscus lens having a convex surface toward the image IMG can be adopted as the second lens 20. At least one surface of the third lens 30 is formed as an aspheric surface or both surfaces of the third lens 30 are formed as aspheric surfaces. Both surfaces of the fourth lens 40 can be aspheric. For example, a negative meniscus lens having a convex surface toward the image IMG can be adopted as the fourth lens 40.

The configurations of the first and second lenses 10 and 20 are such so as to secure an appropriate back focal length (Bf) by reducing the injection angle by decreasing the overall length of the lens system forming the photographic lens. Conventionally, an aperture stop is set between the first lens 10 and the second lens 20 in order to correct aberration in the above lens combination. In this case, however, the length of an exit pupil is reduced and, accordingly, the injection angle increases. Also, when the increased injection angle is corrected, the overall length of the lens system increases. Due to this problem, in the present embodiment, the aperture stop is disposed between the first lens 10 and the object OBJ.

Also, various aberrations can be effectively corrected by making at least one surface of each of the first to fourth lenses 10, 20, 30, and 40 an aspheric surface. The aspheric surfaces of the first lens 10 and the second lens 20 effectively correct aberration around an optical axis and the aspheric surfaces of the third and fourth lenses 30 and 40 effectively correct aberration around a peripheral portion. Also, since the aspheric shape of the surface of the fourth lens 40 toward the object OBJ has an inflection point within an effective range, deterioration of the aberration in the peripheral portion due to the decrease in the overall length is corrected and simultaneously the injection angle is corrected.

In the configuration of a conventional lens system, a negative meniscus lens that is convex toward the object OBJ, not the image IMG, is conventionally adopted and the aspheric surface having an inflection point within the effective range is not toward the object OBJ, but instead toward the image IMG. In this case, in the conventional lens system, although the desired performance is achieved and the injection angle is corrected, in view of the decrease in the overall length, it is very difficult to make the ratio (T/D) of the overall length (T) of the lens system to the diagonal length (D) of a photographic device to be less than "1".

The photographic lens according to the present embodiment satisfies the following condition.

$$0.5 < f/|f_2| < 1 \quad (1)$$

Here, "f" is the focal length of the lens system and "$f_2$" is the focal length of the second lens 20.

The overall length of the lens system forming the photographic lens is decreased according to the condition of Inequality 1 so that an appropriate Bf is secured. If the aberrations are corrected outside of the above range, the decrease in the overall length of the overall lens system or the securing of an appropriate Bf is rather difficult to achieve.

The photographic lens according to the present embodiment further satisfies the following conditions.

$$0.3 < f_1/|f_2| < 0.8 \quad (2)$$

$$0.75 < f_3/|f_4| < 1 \quad (3)$$

In the above inequalities, "$f_1$", "$f_2$", "$f_3$", and "$f_4$" respectively are the focal lengths of the first lens 10, the second lens 20, the third lens 30, and the fourth lens 40. When the condition of Inequality 2 is satisfied, the correction of the aberration around the optical axis while decreasing the overall length of the lens system is made easy. Also, if the condition of Inequality 3 is satisfied, the correction of the aberration around the peripheral portion is made easy. If these conditions are not satisfied, the correction of various aberrations while decreasing the overall length of the lens system and maintaining a desired injection angle are rather difficult to achieve.

Also, the photographic lens according to the present embodiment further satisfies the following conditions.

$$v_1 - v_2 > 15 \quad (4)$$

$$0.9 < v_3/v_4 < 1.1 \quad (5)$$

In Inequalities 4 and 5, "$v_1$", "$v_2$", "$v_3$", and "$v_4$" respectively are the Abbe numbers of the first, second, third, and fourth lenses 10, 20, 30, and 40.

If the condition of Inequality 4 is satisfied, the correction of chromatism is rather easy to achieve. Also, an axial chromatism and magnification chromatism can be simultaneously corrected by the condition of Inequality 5.

The definition of an aspheric surface ASP in the embodiments of the present invention is defined as follows.

$$x = \frac{c'y^2}{1 + \sqrt{1 - (K+1)c'^2 y^2}} + Ay^4 + By^6 + Cy^8 + Dy^{10} \quad (6)$$

Here, "x" is the distance from the vertex of the lens surface along the optical axis, "y" is the distance in a direction perpendicular to the optical axis, "K" is a conic constant, "A, B, C, and D" are aspheric coefficients, and "c'" is the reciprocal of the radius of curvature at the vertex of the lens (=1/R).

The following descriptions refer to lens data according to various embodiments of the present invention. Here, "f" is the focal length of the lens system, "$f_1$" "$f_2$", "$f_3$", and "$f_4$" are the focal lengths of the first to fourth lenses 10, 20, 30, and 40, respectively, and "Bf" is a back focal length. Also, "STO" refers to the aperture stop.

FIRST EMBODIMENT

Figure 2:
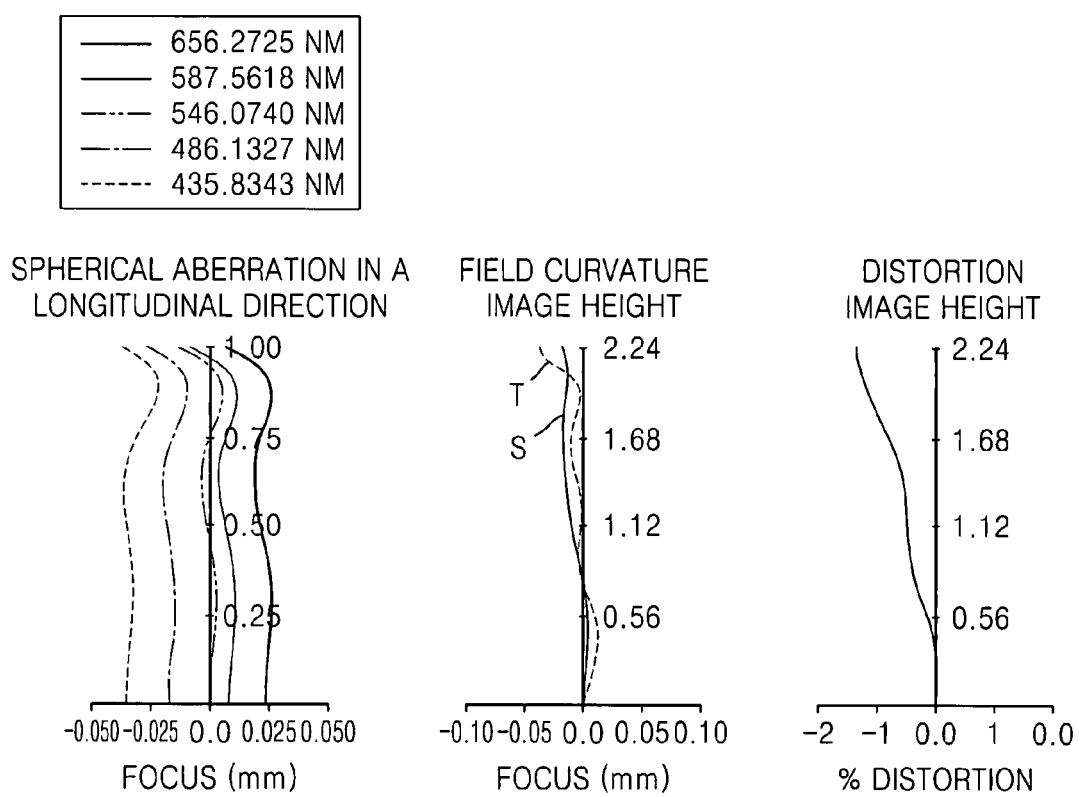
FIG. 2 shows the spherical aberration in a longitudinal direction, field curvature, and distortion of the photographic lens of FIG. 1.

FIG. 1 illustrates the optical configuration of the photographic lens, according to an embodiment of the present invention. FIG. 2 shows the spherical aberration in a longitudinal direction, field curvature, and distortion of the photographic lens of FIG. 1. The spherical aberration in a longitudinal direction is shown with respect to the light having wavelengths of 656.2725 (nm), 587.5618 (nm), 546.0740 (nm), 486.1327 (nm), 435.8343 (nm) and an astigmatic field curvature is shown by a tangential field curvature (T) and a sagittal field curvature (S). The lens data of the first embodiment are shown below.

f: 3.64 mm, $f_1$: 2.64 mm, $f_2$: 5.29 mm, $f_3$: 2.23 mm, $f_4$: 2.55 mm, Fno: 2.94, half image angle (ω): 32.0°, injection angle: 23.2°, Bf (recalculated for air): 0.908 mm, Bf (including filter): 1.01 mm, T/D: 4.098/4.48=0.915

| Surface | Radius of Curvature | Interval | Refractive Index | Abbe's No. |
|---|---|---|---|---|
| OBJ | INFINITY | INFINITY | | |
| 1(STO) | 1.1736 | 0.450 | 1.68976 | 52.7 |
| 2 | 2.7574 | 0.372 | | |
| 3 | −1.8155 | 0.400 | 1.63200 | 23.4 |
| 4 | −4.2562 | 0.359 | | |
| 5 | −4.7608 | 0.573 | 1.53318 | 57.0 |
| 6 | −0.9945 | 0.426 | | |
| 7 | −0.7556 | 0.610 | 1.53318 | 57.0 |
| 8 | −2.1256 | 0.400 | | |
| 9 | INFINITY | 0.300 | 1.51680 | 64.2 |
| 10 | INFINITY | 0.310 | | |
| IMG | INFINITY | 0.000 | | |

| Aspheric surface coefficients | | | |
|---|---|---|---|
| 1 | K: −0.814857 | | |
| | A: 0.933546E−01 | B: 0.156291E+00 | C: −.270276E+00 |
| | D: 0.491412E+00 | | |
| 2 | K: −1.020496 | | |
| | A: 0.360552E−01 | B: 0.000000E+00 | C: 0.000000E+00 |
| | D: 0.000000E+00 | | |
| 3 | K: 5.618813 | | |
| | A: 0.374498E−01 | B: −.245422E+00 | C: 0.880929E+00 |
| | D: −.346733E+00 | | |
| 4 | K: 0.000000 | | |
| | A: 0.482883E−01 | B: −.366867E−01 | C: −.103528E−02 |
| | D: 0.374112E+00 | | |
| 5 | K: 0.000000 | | |
| | A: −.799988E−01 | B: 0.162944E+00 | C: −.231694E+00 |
| | D: 0.105829E+00 | | |
| 6 | K: −4.000614 | | |
| | A: −.254496E+00 | B: 0.451907E+00 | C: −.232175E+00 |
| | D: 0.344666E−01 | | |
| 7 | K: −1.766567 | | |
| | A: 0.244689E+00 | B: −.879476E−01 | C: 0.172483E−01 |
| | D: −.180884E−02 | | |
| 8 | K: 0.000000 | | |
| | A: 0.135029E+00 | B: −.618082E−01 | C: 0.135973E−01 |
| | D: −.103097E−02 | | |

SECOND EMBODIMENT

Figure 3:
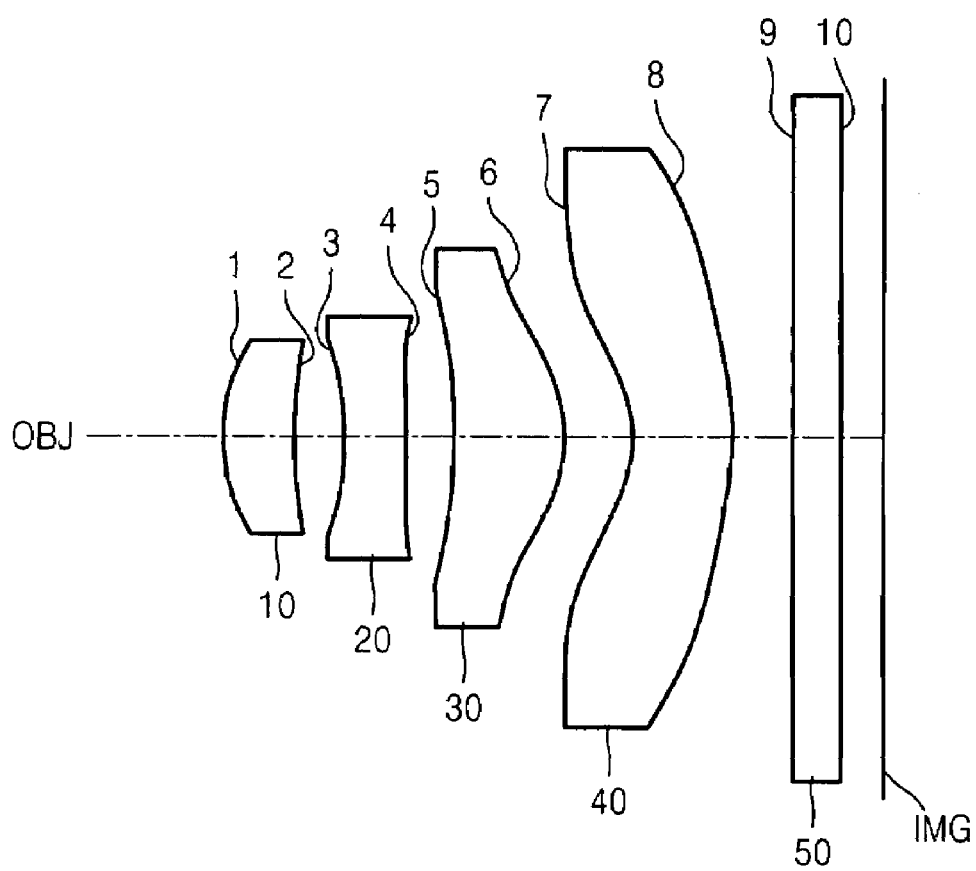
FIG. 3 illustrates the optical configuration of a photographic lens according to another embodiment of the present invention.
Figure 4:
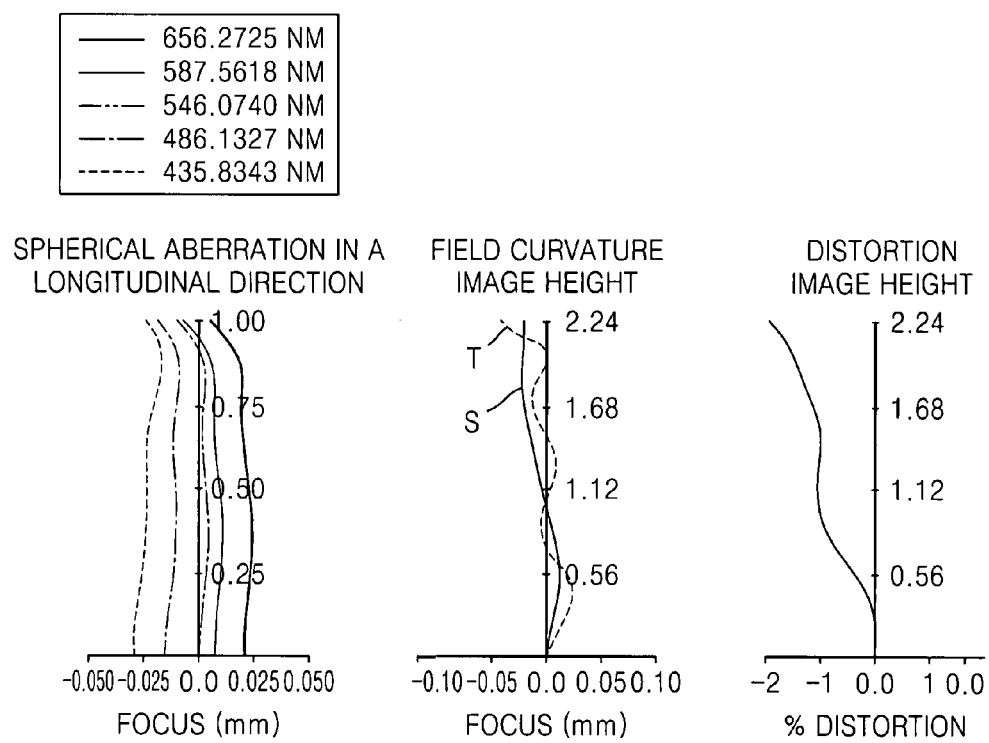
FIG. 4 shows the spherical aberration in a longitudinal direction, field curvature, and distortion of the photographic lens of FIG. 3.

FIG. 3 illustrates the optical configuration of the photographic lens according to another embodiment of the present invention. FIG. 4 shows the spherical aberration in a longitudinal direction, field curvature, and distortion of the photographic lens of FIG. 3. The lens data of the second embodiment are shown below.

f: 3.57 mm, $f_1$: 2.50 mm, $f_2$: 4.60 mm, $f_3$: 1.98 mm, $f_4$: 2.31 mm, Fno: 2.94, half image angle (ω): 32.6°, injection angle: 22.2°, Bf (recalculated for air): 0.858 mm, Bf (including filter): 0.969 mm, T/D: 4.098/4.48=0.915

| Surface | Radius of Curvature | Interval | Refractive Index | Abbe's No. |
|---|---|---|---|---|
| OBJ | INFINITY | INFINITY | | |
| 1(STO) | 1.1979 | 0.450 | 1.69008 | 53.2 |
| 2 | 3.2947 | 0.316 | | |
| 3 | −2.1623 | 0.400 | 1.63200 | 23.4 |
| 4 | −8.7687 | 0.303 | | |
| 5 | −3.5341 | 0.705 | 1.53318 | 57.0 |
| 6 | −0.8736 | 0.432 | | |
| 7 | −0.6913 | 0.634 | 1.53318 | 57.0 |
| 8 | −2.0694 | 0.400 | | |
| 9 | INFINITY | 0.300 | 1.51680 | 64.2 |
| 10 | INFINITY | 0.260 | | |
| IMG | INFINITY | 0.000 | | |

| Aspheric surface coefficients | | | |
|---|---|---|---|
| 1 | K: −0.813945 | | |
| | A: 0.985167E−01 | B: 0.136377E+00 | C: −.187154E+00 |
| | D: 0.411078E+00 | | |
| 2 | K: 8.024763 | | |
| | A: 0.207964E−01 | B: 0.000000E+00 | C: 0.000000E+00 |
| | D: 0.000000E+00 | | |
| 3 | K: 8.493156 | | |
| | A: 0.123787E+00 | B: −.239868E+00 | C: 0.503580E+00 |
| | D: −.202632E+00 | | |
| 4 | K: 0.000000 | | |
| | A: 0.188510E+00 | B: −.963151E−01 | C: −.649468E−01 |
| | D: 0.321760E+00 | | |
| 5 | K: 0.000000 | | |
| | A: −.121594E−01 | B: 0.179032E+00 | C: −.236589E+00 |
| | D: 0.743213E−01 | | |
| 6 | K: −3.719325 | | |
| | A: −.287123E+00 | B: 0.483603E+00 | C: −.228737E+00 |
| | D: 0.277903E−01 | | |
| 7 | K: −2.180093 | | |
| | A: 0.215479E+00 | B: −.833907E−01 | C: 0.190205E−01 |
| | D: −.228337E−02 | | |
| 8 | K: 0.000000 | | |
| | A: 0.149045E+00 | B: −.660656E−01 | C: 0.146381E−01 |
| | D: −.113746E−02 | | |

THIRD EMBODIMENT

Figure 5:
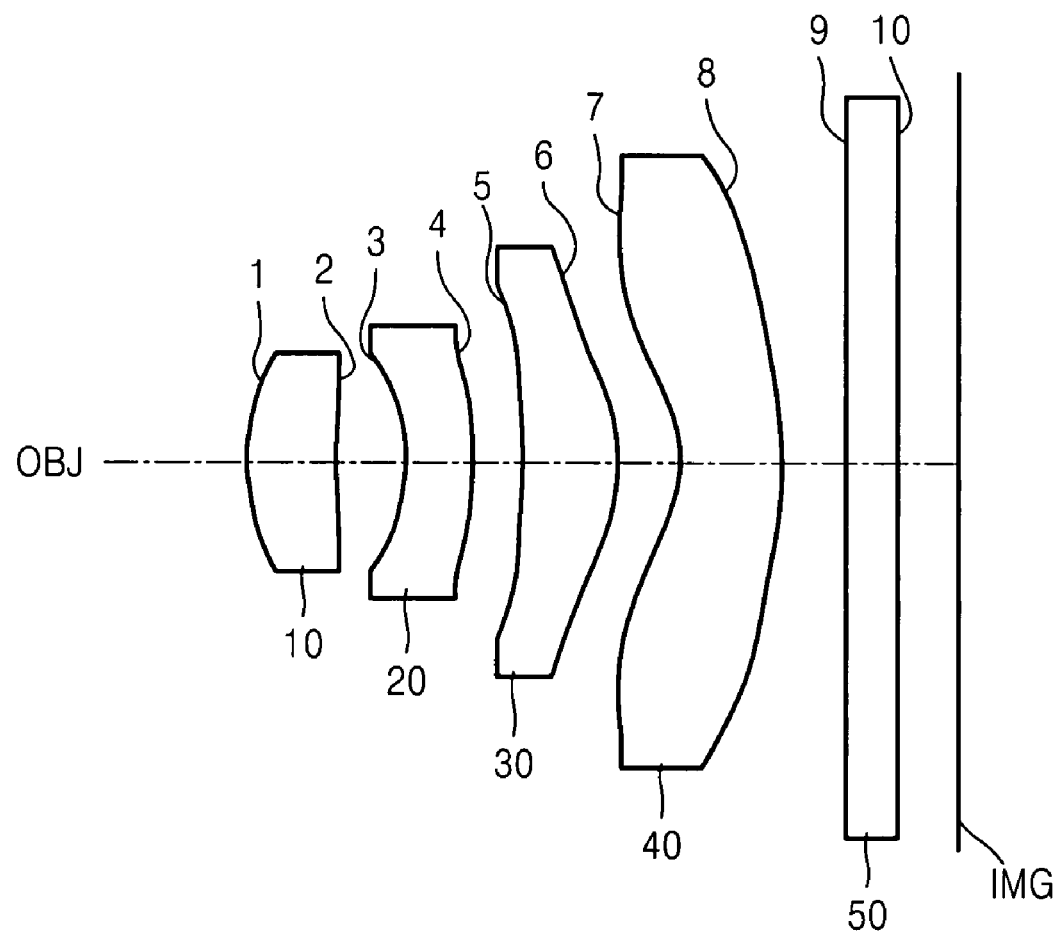
FIG. 5 illustrates the optical configuration of a photographic lens according to another embodiment of the present invention.
Figure 6:
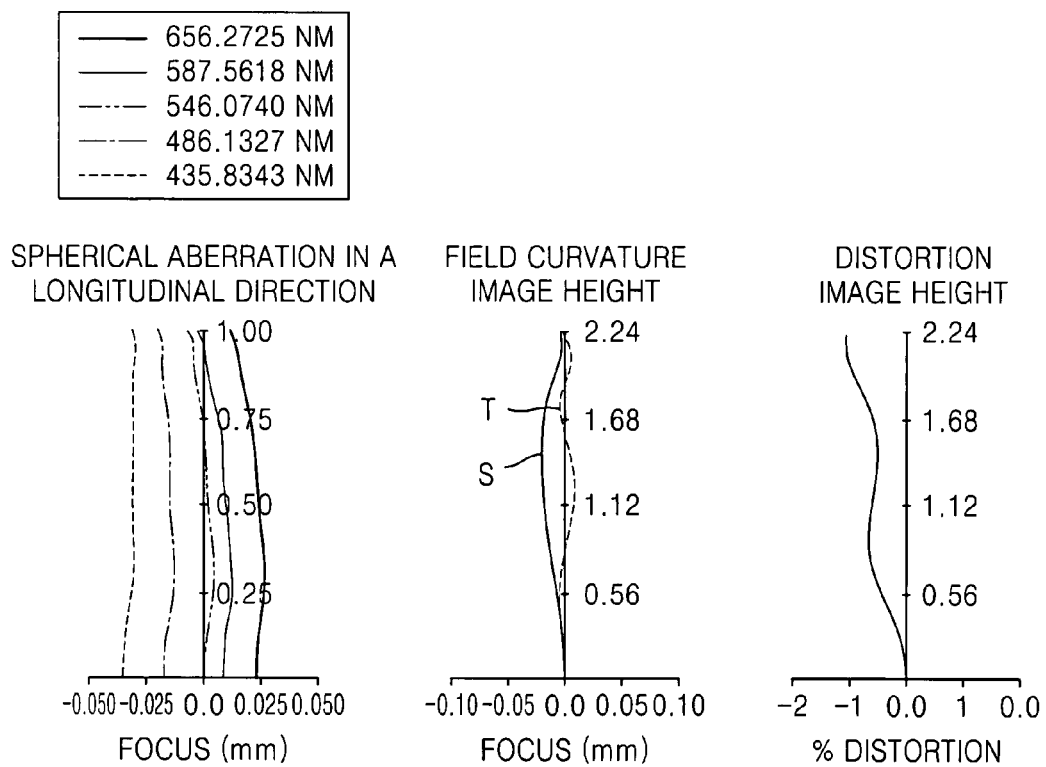
FIG. 6 shows the spherical aberration in a longitudinal direction, field curvature, and distortion of the photographic lens of FIG. 5.

FIG. 5 illustrates the optical configuration of the photographic lens according to another embodiment of the present invention. FIG. 6 shows the spherical aberration in a longitudinal direction, field curvature, and distortion of the photographic lens of FIG. 5. The lens data of the third embodiment are shown below.

f: 3.55 mm, $f_1$: 2.57 mm, $f_2$: 5.41 mm, $f_3$: 2.10 mm, $f_4$: 2.37 mm, Fno: 2.94, half image angle (ω): 32.5°, injection angle: 23.3°, Bf (recalculated for air): 0.948 mm, Bf (including filter): 1.050 mm, T/D: 4.098/4.48=0.915

| Surface | Radius of Curvature | Interval | Refractive Index | Abbe's No. |
|---|---|---|---|---|
| OBJ | INFINITY | INFINITY | | |
| 1(STO) | 1.2759 | 0.520 | 1.69008 | 53.2 |
| 2 | 3.7495 | 0.409 | | |
| 3 | −1.2827 | 0.400 | 1.63200 | 23.4 |
| 4 | −2.2871 | 0.296 | | |
| 5 | −5.8284 | 0.570 | 1.53318 | 57.0 |
| 6 | −0.9750 | 0.356 | | |
| 7 | −0.7742 | 0.600 | 1.53318 | 57.0 |
| 8 | −2.5309 | 0.400 | | |
| 9 | INFINITY | 0.300 | 1.51680 | 64.2 |
| 10 | INFINITY | 0.350 | | |
| IMG | INFINITY | 0.000 | | |

| Aspheric surface coefficients | | | |
|---|---|---|---|
| 1 | K: −8.122308 | | |
| | A: 0.485111E+00 | B: −.798665E+00 | C: 0.130707E+01 |
| | D: −.126420E+01 | | |
| 2 | K: 0.000000 | | |
| | A: −.671566E−01 | B: −.270897E+00 | C: 0.191759E+00 |
| | D: −.978663E+00 | | |
| 3 | K: 0.000000 | | |
| | A: −.174091E+00 | B: −.504499E+00 | C: 0.112577E+01 |
| | D: −.137031E+01 | | |
| 4 | K: 0.000000 | | |
| | A: 0.207217E−01 | B: −.206921E+00 | C: 0.373992E+00 |
| | D: 0.257463E+00 | | |
| 5 | K: 6.465619 | | |
| | A: 0.384742E−01 | B: −.172270E+00 | C: 0.966087E−01 |
| | D: −.432027E−02 | | |
| 6 | K: −0.666111 | | |
| | A: 0.271693E+00 | B: 0.187698E−01 | C: −.264732E−01 |
| | D: 0.215674E−03 | | |
| 7 | K: −2.088848 | | |
| | A: 0.240775E+00 | B: −.921450E−01 | C: 0.184297E−01 |
| | D: −.164891E−02 | | |
| 8 | K: 0.000000 | | |
| | A: 0.108927E+00 | B: −.514196E−01 | C: 0.973038E−02 |
| | D: −.507653E−03 | | |

FOURTH EMBODIMENT

Figure 7:
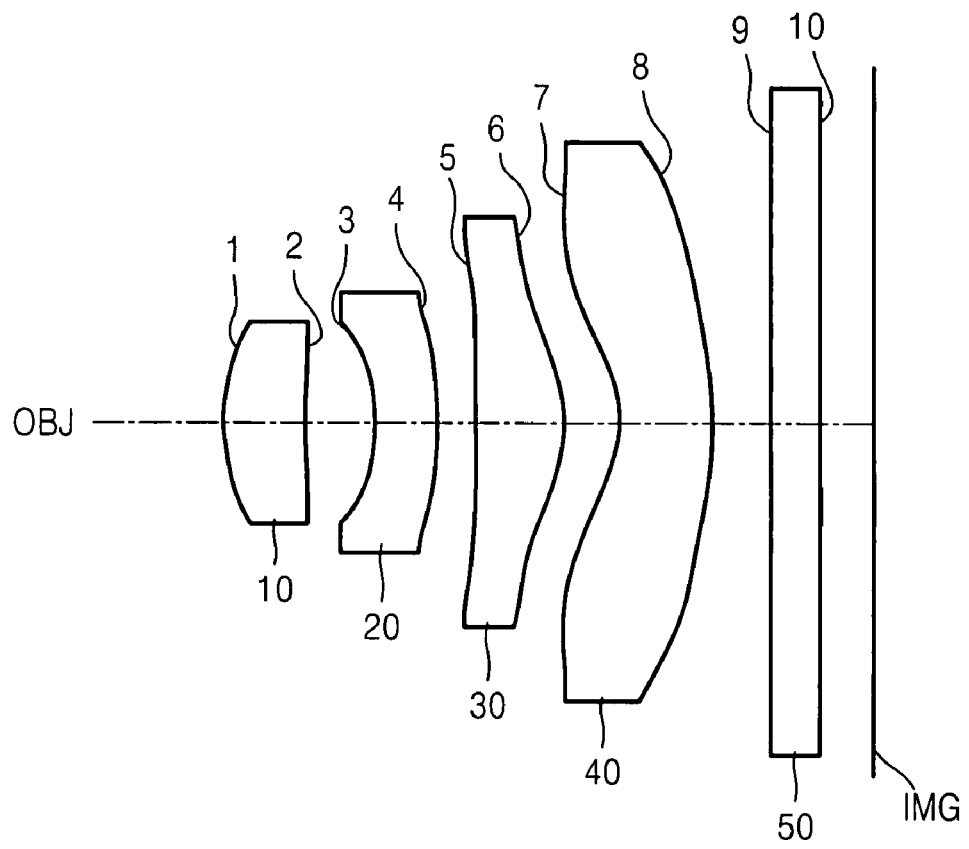
FIG. 7 illustrates the optical configuration of a photographic lens according to another embodiment of the present invention.
Figure 8:
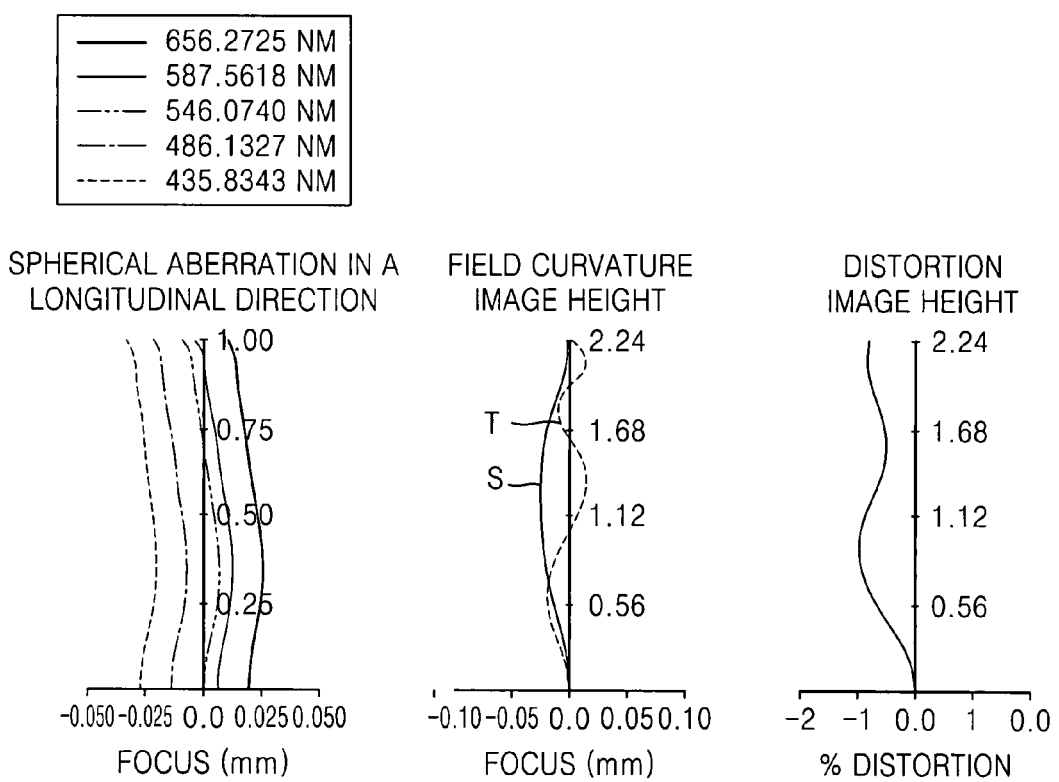
FIG. 8 shows spherical aberration in a longitudinal direction, field curvature, and distortion of the photographic lens of FIG. 7.

FIG. 7 illustrates the optical configuration of the photographic lens according to another embodiment of the present invention. FIG. 8 shows the vertical spherical aberration, field curvature, and distortion of the photographic lens of FIG. 7. The lens data of the fourth embodiment are shown below.

f: 3.55 mm, $f_1$: 2.69 mm, $f_2$: 3.84 mm, $f_3$: 1.78 mm, $f_4$: 2.21 mm, Fno: 2.94, half image angle ($\omega$): 32.5°, injection angle: 23.2°, Bf (recalculated for air): 0.948 mm, Bf (including filter): 1.050 mm, T/D: 4.098/4.48=0.915

| Surface | Radius of Curvature | Interval | Refractive Index | Abbe's No. |
|---|---|---|---|---|
| OBJ | INFINITY | INFINITY | | |
| 1(STO) | 1.2558 | 0.520 | 1.69008 | 53.2 |
| 2 | 3.1909 | 0.456 | | |
| 3 | −1.4331 | 0.400 | 1.63200 | 23.4 |
| 4 | −3.8185 | 0.251 | | |
| 5 | 54.2772 | 0.570 | 1.53318 | 57.0 |
| 6 | −0.9666 | 0.353 | | |
| 7 | −0.7495 | 0.600 | 1.53318 | 57.0 |
| 8 | −2.6201 | 0.400 | | |
| 9 | INFINITY | 0.300 | 1.51680 | 64.2 |
| 10 | INFINITY | 0.350 | | |
| IMG | INFINITY | 0.000 | | |

| Aspheric surface coefficients | | | |
|---|---|---|---|
| 1 | K: −7.816901 | | |
| | A: 0.490163E+00 | B: −.769682E+00 | C: 0.123803E+01 |
| | D: −.114142E+01 | | |
| 2 | K: 0.000000 | | |
| | A: −.468616E−01 | B: −.292017E+00 | C: 0.420222E+00 |
| | D: −.133588E+01 | | |
| 3 | K: 0.000000 | | |
| | A: −.343873E+00 | B: −.419484E+00 | C: 0.956812E+00 |
| | D: −.175887E+01 | | |
| 4 | K: 0.000000 | | |
| | A: −.173775E+00 | B: −.820753E−01 | C: 0.162489E+00 |
| | D: 0.314284E+00 | | |
| 5 | K: 0.000000 | | |
| | A: 0.260869E−01 | B: −.202656E+00 | C: 0.159285E+00 |
| | D: −.354382E−01 | | |
| 6 | K: −0.977119 | | |
| | A: 0.301824E+00 | B: −.171367E−01 | C: −.357279E−01 |
| | D: 0.655890E−02 | | |
| 7 | K: −2.291668 | | |
| | A: 0.227209E+00 | B: −.862387E−01 | C: 0.171513E−01 |
| | D: −.149677E−02 | | |
| 8 | K: 0.000000 | | |
| | A: 0.107382E+00 | B: −.473121E−01 | C: 0.704576E−02 |
| | D: −.814603E−04 | | |

In the above-described first to fourth embodiments, the values satisfying the Inequalities (1) to (5) are shown in Table 1 below.

TABLE 1

| | Inequality 1 | Inequality 2 | Inequality 3 | Inequality 4 | Inequality 5 |
|---|---|---|---|---|---|
| 1st Embodiment | 0.688 | 0.499 | 0.875 | 29.3 | 1 |
| 2nd Embodiment | 0.776 | 0.543 | 0.857 | 29.8 | 1 |
| 3rd Embodiment | 0.656 | 0.475 | 0.886 | 29.8 | 1 |
| 4th Embodiment | 0.924 | 0.701 | 0.805 | 29.8 | 1 |

As described above, in the photographic lens according to the present invention, the surface of the fourth lens toward the object OBJ is an aspheric surface and the aspheric surface includes an inflection point. Thus, a thin and compact photographic lens having a sufficient resolution can be provided. Also, by appropriately selecting the aspheric surface of each of the first through fourth lenses, a T/D ratio less than 1 is achieved, a sufficient Bf is secured, and a photographic lens maintaining the injection angle between 20°-25° so as to prevent a shading problem is provided.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A photographic lens comprising:
   a first lens having a positive refractive power;
   a second lens having a negative refractive power;
   a third lens having a positive refractive power; and
   a fourth lens having a negative refractive power, wherein:
   the lenses are numbered in order of location from the object,
   a surface of the fourth lens toward the object is an aspheric surface having an inflection point; and
   the photographic lens satisfies an inequality such that $0.75 < f_3/|f_4| < 1$, wherein "$f_3$" and "$f_4$" respectively are focal lengths of the third lens and the fourth lens.

2. The photographic lens of claim 1, wherein at least one surface of each of the first to fourth lenses is an aspheric surface.

3. The photographic lens of claim 1, wherein both surfaces of each of the first to fourth lenses are aspheric surfaces.

4. The photographic lens of claim 1, wherein an aperture stop is disposed between the first lens and the object.

5. The photographic lens of claim 1, wherein the first lens is a meniscus lens having a convex surface toward the object.

6. The photographic lens of claim 1, wherein the second lens is a meniscus lens having a convex surface toward the image.

7. The photographic lens of claim 1, wherein the fourth lens is a meniscus lens having a convex surface toward the image.

8. The photographic lens of claim 1, satisfying an inequality such that $0.5 < f/|f_2| < 1$, wherein "f" is a focal length of the overall lens and "$f_2$" is a focal length of the second lens.

9. The photographic lens of claim 1, satisfying an inequality such that $0.3 < f_1/|f_2| < 0.8$, wherein "$f_1$" and "$f_2$" respectively are focal lengths of the first lens and the second lens.

10. The photographic lens of claim 1, satisfying an inequality such that $v_1 - v_2 > 15$, wherein "$v_1$" and "$v_2$" respectively are the Abbe numbers of the first and second lenses.

11. The photographic lens of claim 10, satisfying an inequality such that $0.9 < v_3/v_4 < 1.1$, wherein "$v_3$" and "$v_4$" respectively are the Abbe numbers of the third and fourth lenses.

* * * * *